United States Patent
Recio, III et al.

(10) Patent No.: US 12,187,955 B2
(45) Date of Patent: Jan. 7, 2025

(54) NANOPARTICLE WEDGE EFFECT TO INDUCE WATER WETTABILITY

(71) Applicant: Halliburton Energy Services, Inc., Houston, TX (US)

(72) Inventors: Antonio Recio, III, Humble, TX (US); Enrique A. Reyes, Cypress, TX (US); Denise N. Benoit, Houston, TX (US); Aaron M. Beuterbaugh, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/495,986

(22) Filed: Oct. 7, 2021

(65) Prior Publication Data

US 2023/0115715 A1 Apr. 13, 2023

(51) Int. Cl.
  C09K 8/035 (2006.01)
  C09K 8/03 (2006.01)
  C09K 8/04 (2006.01)

(52) U.S. Cl.
  CPC ............ C09K 8/035 (2013.01); C09K 8/032 (2013.01); C09K 8/04 (2013.01); C09K 2208/10 (2013.01)

(58) Field of Classification Search
  CPC .......... C09K 8/035; C09K 8/032; C09K 8/04; C09K 2208/10; Y10S 507/935; Y10S 507/936
  See application file for complete search history.

(56) References Cited

U.S. PATENT DOCUMENTS

| | | | |
|---|---|---|---|
| 9,926,485 B2 | 3/2018 | Yan et al. | |
| 10,377,942 B2 | 8/2019 | Southwell et al. | |
| 10,557,078 B2 | 2/2020 | Southwell | |
| 10,801,310 B2 | 10/2020 | Watts et al. | |
| 2010/0096139 A1* | 4/2010 | Holcomb | C09K 8/70 166/308.1 |
| 2017/0298265 A1* | 10/2017 | Smith | C09K 8/74 |
| 2018/0002595 A1 | 1/2018 | Neil et al. | |
| 2018/0362834 A1 | 12/2018 | Jaghighi et al. | |
| 2019/0003295 A1* | 1/2019 | Ehlig-Economides | E21B 43/305 |

(Continued)

FOREIGN PATENT DOCUMENTS

| | | |
|---|---|---|
| WO | 2018232076 A1 | 12/2018 |
| WO | 2020101644 A1 | 5/2020 |

OTHER PUBLICATIONS

Syfan, et al. "Enhancing Delaware Basin Stimulation Results Using Nanoparticle Dispersion Technology", SPE-189876-MS, Jan. 2018, pp. 1-24.

(Continued)

Primary Examiner — Aiqun Li
(74) Attorney, Agent, or Firm — Barnes & Thornburg, LLP (57) ABSTRACT

Methods and treatments fluids for treating a wellbore. One example method introduces the treatment fluid into the wellbore. The treatment fluid comprises an aqueous fluid, an aminopolycarboxylic acid, a nanoparticle dispersed, and an organic solvent. The treatment fluid has a pH in a range between about 5 to about 9. The method further includes contacting a rock surface in the subterranean formation; wherein at least a portion of the rock surface is coated with a hydrocarbon. The treatment fluid removes a portion of the hydrocarbon from the rock surface and alters the rock surface to be water-wet.

11 Claims, 2 Drawing Sheets

(56) References Cited

U.S. PATENT DOCUMENTS

| | | | |
|---|---|---|---|
| 2019/0136123 A1 | 5/2019 | Holcomb et al. | |
| 2020/0017756 A1 | 1/2020 | Haghighi et al. | |
| 2020/0140748 A1 | 5/2020 | Southwell et al. | |
| 2021/0147743 A1* | 5/2021 | Suresh | E21B 43/16 |

OTHER PUBLICATIONS

Kuang, et al. "A systematic experimental investigation on the synergistic effects of aqueous nanofluids on interfacial properties and their implications for enhanced oil recovery", Fuel 220 (2018) 849-870. SPE 185161, May 2017.

Al-Muntasheri, et al. "Nanoparticle-Enhanced Hydraulic-Fracturing Fluids: A Review", pp. 186-195.

International Search Report & Written Opinion in PCT/US2021/054444, dated Jun. 28, 2022.

Hendraningrat, L. et al. "Metal oxide-based nanoparticles: revealing their potential to enhance oil recovery in different wettability systems", Applied Nanoscience (2015) vol. 5, No. 2, pp. 181-199.

Eltoum, H. et al. "The effect of nanoparticles on reservoir wettability alteration: a critcal review", Petroleum Science (2021), vol. 18, No. 1, pp. 136-153.

Kuang, et al. "A systematic experimental investigation on the synergistic effects of aqueous nanofluids on interfacial properties and their implications for enhanced oil recovery", FUEL 220 (2018) 849-870.

Pinto, et al. "Biodegradable chelating agents for industrial, domestic, and agricultural applications—a review", Environ Sci Pollut Res (2014) 21:11893-11906.

Martell, et al. "Critical Stability Constants", 1974, vol. 1: Amino Acids, 1 pg.

* cited by examiner

NANOPARTICLE WEDGE EFFECT TO INDUCE WATER WETTABILITY

TECHNICAL FIELD

The present disclosure relates generally to stimulation and recovery operations, and more particularly, to operations to alter the wettability of rock surfaces in a subterranean formation.

BACKGROUND

Refracturing, restimulating, waterflooding, and enhanced oil recovery operations may be used to reverse formation damage caused during primary production. One such technique is to remove an oil coating on a rock surface and then alter the wettability of the rock surface to be water-wet. Oil heavy ends such as asphaltenes and waxes can resist fluid flow and remain on surfaces they contact. These oil heavy ends may trap the oil therein by reducing permeability and flowthrough. Further, these oil heavies may resist displacement, impacting attempts to improve production and prevent further formation damage. Oil-wet surfaces may decrease production by decreasing communication between secondary fractures and main fractures. Oil-wet proppant packs may have decreased permeability.

Regardless of the chosen operation, removing an oil-wet surface and altering the wettability of a rock surface to be water-wet may improve subsequent recovery and production operations. The present invention provides improved methods and compositions for altering the wettability of rock surfaces in a subterranean formation.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

The present disclosure relates generally to stimulation and recovery operations, and more particularly, to operations to alter the wettability of rock surfaces in a subterranean formation.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The examples described herein relate to the use of treatment fluids and methods to alter the wettability of a rock surface in a subterranean formation. The treatment fluid comprises an aminopolycarboxylic acid and at least one species of nanoparticle. The nanoparticles are both negatively and positively charged and self-aggregate into larger microstructures with an affinity for surfaces having heterogenous charge distributions. The nanoparticle microstructures and the aminopolycarboxylic acid come into contact with a discontinuous phase, such as a rock surface with mixed wettability, and form a film thereon. The film diffuses to the rock surface through Brownian motion and wedges under the oil droplets coating the rock surface. Once in place, the formed wedge increases the disjoining pressure to separate the oil droplets from the rock surface. The electrostatic forces between the nanoparticle microstructures separate the oil globules from the surface thereby rendering the rock surface water-wet and cleaning the rock of the oil coating.

Advantageously, the treatment fluid may be used in refracturing, restimulating, water flooding, and other types of enhanced oil recovery operations. A further advantage is that the treatment fluids and methods may remove oil from the rock surface allowing the rock surface to be made water-wet and for the oil coating to be displaced. A consequence of removing the oil from the water surface is that fluid flow and permeability may be improved as fractures are reconnected and proppant packs are unblocked. An additional advantage is that the treatment fluid may be used at a neutral or near-neutral pH. A further advantage is that the pore properties of some rock types may be improved. For example, calcite rock may see some calcium dissolution under treatment with the treatment fluid at a neutral or near-neutral pH. This effect may not only clean pores of oil deposits, but may also improve pore connectivity and improve fluid flow through tight pore spaces.

Figure 1:
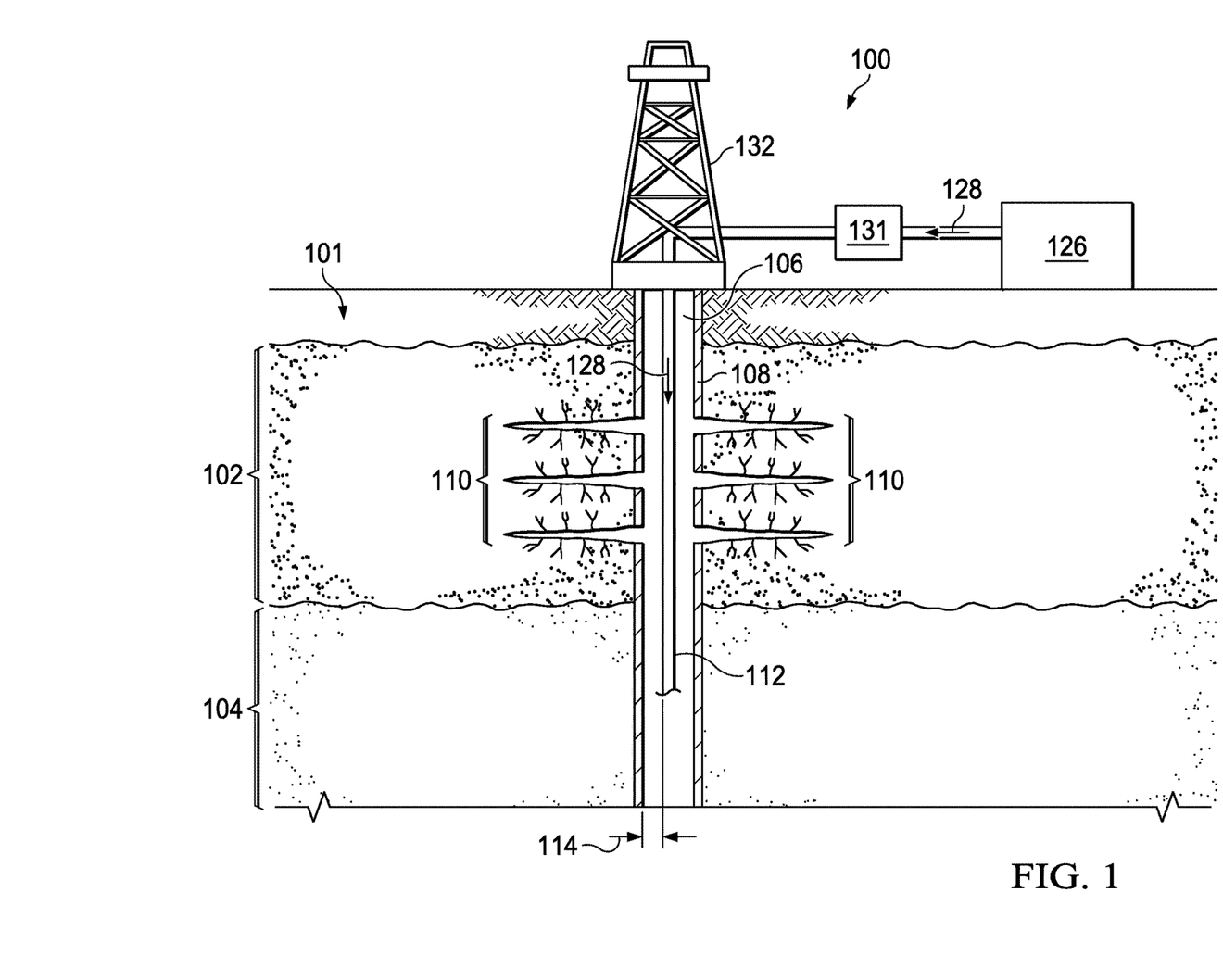
FIG. 1 is a schematic illustrating an example refracturing/restimulating operation in accordance with one or more examples described herein.

FIG. 1 is a schematic view of an example refracturing/restimulating system 100 according to one or more examples. The formation 101 includes reservoir volumes 102, 104 composed of porous and permeable rocks (i.e., reservoir rocks) that contain reservoir fluids (e.g., oil, gas, water, hydrocarbons) located in an onshore environment or in an offshore environment. A well system includes at least one well 106 drilled to penetrate the formation 101 to carry out exploration and extraction of hydrocarbon fluids from the reservoir volumes 102, 104. The well 106 of FIG. 1 is shown as near-vertical, but can be formed at any suitable angle to reach a hydrocarbon-rich portion of the formation 101. In other examples, the well 106 can follow a partially-vertical, angled, or even a partially-horizontal path through the formation 101. The well 106 is shown as being lined with a protective lining 108 extending through the formation 101. The protective lining 108 may include a casing, liner, or tubing made of any material, including steel, alloys, or polymers, among others. The well 106 may also be partially or fully openhole, i.e., no protective lining. The protective lining 108 is perforated so that the reservoir fluids flow through fractures 110 formed in the formation 101 and into the well 106.

During production, hydrocarbons contact formation surfaces within fractures 110. A portion of the hydrocarbons may lodge within the openings of smaller fractures, the pores of the formation rock, and/or the interstitial spaces between the proppant particles of a proppant pack. As the hydrocarbons are produced from the reservoir rocks, the pressure, flow capacity, and recovery factor from the reservoir volume 102 may be reduced due to these hydrocarbon blockages. As such, it may be desirable to clean the oil from these surfaces and to water-wet the rock surfaces.

A treatment fluid 128 is injected into the well 106 to flow into a tubing string 112 or an annular area 114 located between an inner surface of the well 106 and the tubing string 112. The surface portion of system 100 delivers a treatment fluid 128 to a target downhole location. It should be understood that while the surface portion of system 100 in FIG. 1 generally depicts a land-based system, it is to be recognized that like systems may be operated in subsea locations as well and may include subsea equipment and installations such as risers, tiebacks, flow lines, pumps, mandrels; equally, different maritime units and installations such as floating production offloading vessel are applicable. The surface portion of system 100 may include mixing tank 126 in which a treatment fluid 128 of the present disclosure may be formulated. The treatment fluid 128 may be conveyed via a pump 131 to a wellhead 132, where the treatment fluid 128 enters tubing string 112. Tubing string 112 extends from wellhead 132 into formation 101. Tubing string 112 includes orifices that allow the treatment fluid 128 to enter into the well 106. Pump 131 may be configured to raise the pressure of the treatment fluid 128 to a desired degree before its introduction into tubing string 112. It is to be recognized that system 100 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Mixing tank 126 may be upstream of pump 131 and may comprise a vessel in which the components of the treatment fluid 128 are provided and formulated. In various examples, pump 131 (e.g., a low-pressure pump, a high-pressure pump, or a combination thereof) may convey the treatment fluid 128 from mixing tank 126 or other source of the treatment fluid 128 to tubing string 112. In other examples, the treatment fluid 128 may be formulated offsite and transported to a worksite, in which case the treatment fluid 128 may be introduced to tubing string 112 via pump 131 directly from its shipping container (e.g., a truck, a railcar, a barge, or the like) or from a transport pipeline. In either case, the treatment fluid 128 may be drawn into pump 131, elevated to an appropriate pressure, and then introduced into tubing string 112 for delivery downhole.

Pump 131 may be a high-pressure pump in some examples. As used herein, the term "high-pressure pump" will refer to a pump that is capable of delivering a fluid downhole at a pressure of about 1000 psi or greater. The treatment fluids 128 described herein may be introduced with a high-pressure pump. In some examples, the high-pressure pump may be capable of fluidly conveying particulate matter into formation 101. Suitable high-pressure pumps will be known to one having ordinary skill in the art and may include, but are not limited to, floating piston pumps and positive displacement pumps.

In other examples, the pump 131 may be a low-pressure pump. As used herein, the term "low-pressure pump" will refer to a pump 131 that operates at a pressure of less than about 1000 psi. In some examples, a low-pressure pump may be fluidly coupled to a high-pressure pump that is fluidly coupled to tubing string 112. That is, the low-pressure pump may be configured to convey the treatment fluid to the high-pressure pump. In such examples, the low-pressure pump may "step up" the pressure of a treatment fluid 128 before it reaches the high-pressure pump. Alternatively, the low-pressure pump may be used to directly introduce the treatment fluid 128 to formation 101 at a lower pressure.

In the illustrated example, the pump 131 pressurizes treatment fluid 128 to maintain an injection flow rate sufficient to inject and deliver the treatment fluid 128 into the well 106 and further into the fractures 110. Once within the fractures 110, the treatment fluid 128 treats the rock surfaces and proppant pack within the fractures 110. The treatment fluid comprises nanoparticles and an aminopolycarboxylic acid. The nanoparticles self-assemble into microstructures and as these microstructures and the aminopolycarboxylic acid come into contact with a discontinuous phase, such as a rock surface with mixed wettability, they form a film thereon. The film diffuses to the rock surface through Brownian motion and wedges under the oil droplets increasing the disjoining pressure. The electrostatic forces between the nanoparticle microstructures separate the oil globules from the surface thereby rendering the rock surface water-wet. The separated oil droplets are then able to be displaced out of the fractures 110, improving fluid flow therethrough. The treatment fluid 128 may reconnect secondary fractures with primary fractures, remove blockages from the proppant pack, and expand and improve flow through the pore spaces of the formation 101 rock.

It is to be understood that other alternative methods of injection of treatment fluid 128 may be performed in an analogous manner. For example, instead of injection into fractures 110 via well 106 and tubing string 112, injection may occur through an adjacent or child well that has a connecting fluid pathway to fractures 110. The method of injection into the adjacent or child well would be analogous to that described above in FIG. 1.

It should be clearly understood that the example system 100 illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2:
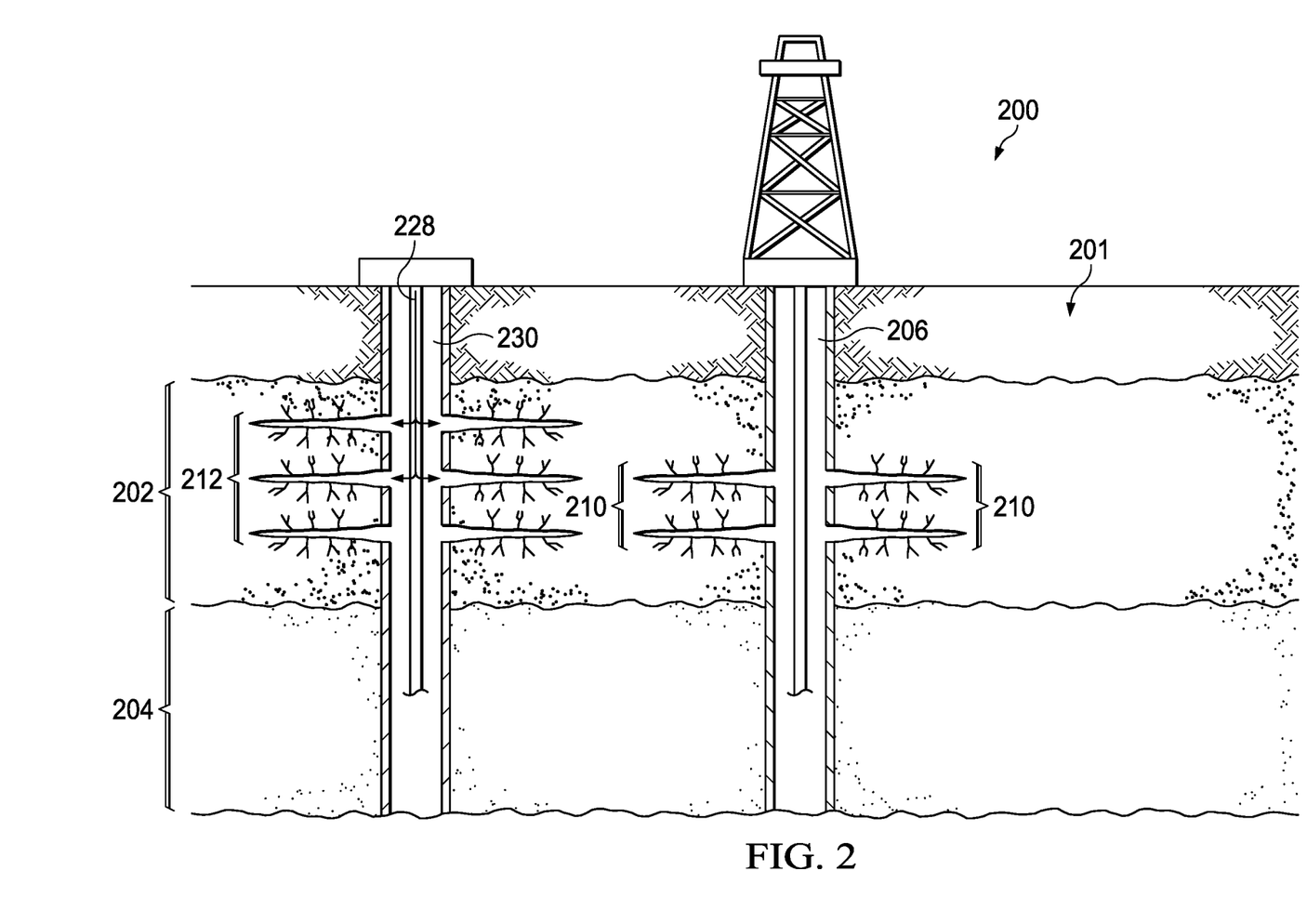
FIG. 2 is a schematic illustrating an example of a waterflood operation in accordance with one or more examples described herein.

FIG. 2 is a schematic view of a system 200 illustrating a subterranean formation 201 before waterflooding a reservoir volume 202. An initial well drilled to discover and produce fluids from one or more reservoir volumes 202, 204 is often referred to as a parent well 206. As fluids are recovered from the reservoir volume 202 through the parent well 206, a portion of the hydrocarbons may lodge within the openings of smaller fractures, the pores of the formation rock, and/or the interstitial spaces between the proppant particles of a proppant pack. As the hydrocarbons are produced from the reservoir rocks, the pressure, flow capacity, and recovery factor from the reservoir volume 202 may be reduced due to these hydrocarbon blockages. As such, it may be desirable to clean the oil from these surfaces and to water-wet the rock surfaces.

In some operations, a child well 230, also known as an injection well, may be drilled and completed in a producing area or between a producing well(s), such as the parent well 206, to treat the parent well 206 and/or contact portions of one or more reservoir volumes 202, 204 that are to be water-flooded. To promote production, the child well 230 is stimulated to produce fluids unrecovered from the reservoir volume 202, not easily accessible through the parent well 206, and/or fluids from the adjacent reservoir volume 204.

In the illustrated example, as part of the water-flooding operation, a treatment fluid 228 may be injected into the chile well 230 and further into the fractures 212. Once within the fractures 212, the treatment fluid 228 flows through the path of least resistance in the reservoir volume 202 to engage the fractures 210 of the parent well 206. Once within the fractures 210, the treatment fluid 228 treats the rock surfaces and proppant pack within the fractures 210. The treatment fluid comprises nanoparticles and an aminopolycarboxylic acid. The nanoparticles self-assemble into microstructures and as these microstructures and the aminopolycarboxylic acid come into contact with a discontinuous phase, such as a rock surface with mixed wettability, they form a film thereon. The film diffuses to the rock surface through Brownian motion and wedges under the oil droplets increasing the disjoining pressure. The electrostatic forces between the nanoparticle microstructures separate the oil globules from the surface thereby rendering the rock surface water-wet. The separated oil droplets are then able to be displaced out of the fractures 210, improving fluid flow therethrough. The treatment fluid 228 may reconnect secondary fractures with primary fractures, remove blockages from the proppant pack, and expand and improve flow through the pore spaces of the formation 201 rock.

The treatment fluid 228 may be injected into the child well 230 before the injection of the water for the water-flood, or it may be injected simultaneously with the water for the water-flood. With the benefit of this disclosure, one of ordinary skill in the art will be readily able to determine the best time to inject the treatment fluid 228 during a water-flood operation.

It is to be understood that other alternative methods of injection of treatment fluid 228 may be performed in an analogous manner. For example, instead of water-flood operation, other enhanced recovery operations may be performed. In one example a gas (e.g., carbon dioxide, natural gas, or nitrogen) may be introduced instead of water. The gas may be introduced into the parent or child well to drive production and in some cases help repressurize a formation. The treatment fluid 228 may be introduced prior to simultaneously with the gas. The method of injection into the parent, adjacent, or child well would be analogous to that described above in FIG. 2. As another alternative, heated steam may be introduced instead of water. The steam may be introduced into the parent or child well to drive production and in some cases help repressurize a formation. The treatment fluid 228 may be introduced prior to simultaneously with the steam. The method of injection into the parent, adjacent, or child well would be analogous to that described above in FIG. 2.

It should be clearly understood that the example system 200 illustrated by FIG. 2 is merely a general application of the principles of this disclosure in practice, and a wide variety of other examples are possible. Therefore, the scope of this disclosure is not limited in any manner to the details of FIG. 2 as described herein.

The treatment fluid comprises an aqueous fluid. In some optional embodiments, the treatment fluid comprises an oleaginous fluid in addition to the aqueous fluid. The treatment fluid may be provided as an emulsion, microemulsion, nanoemulsion, or dispersion. In some examples, the aminopolycarboxylic acid may be added as a salt to the treatment fluid where it may disperse into the aqueous fluid. The aminopolycarboxylic acid may include, but is not limited to, N-Phosphonomethyl iminodiacetic acid ("PMIDA"), Glycine-N,N-bis(methylene phosphonic acid) (BPMG), hydroxyethylenediaminetetraacetic acid (EDTA), N-(2-hydroxyethyl)ethylenediaminetriacetic acid (HEDTA), hydroxyethyliminodiacetic acid (HEIDA), methylglycine diacetic acid (MGDA), glutamic acid diacetic acid (GLDA), ethylenediaminedisuccinic acid (EDDS), 3-hydroxy-2,2'-iminodisuccinic acid (HIDS), beta-alaninediacetic acid (beta-ADA), diethylenetriaminepentaacetic acid (DTPA), cyclohexylenediaminetetraacetic acid (CDTA), nitrilotriacetic acid (NTA), diphenylaminesulfonic acid (DPAS), polyaminoacids, polyaspartic acid, polyitaconic acid, polysuccinic acid, polylactic acid, polyglycolic acid, or any combination thereof.

In some examples, the aminopolycarboxylic acid may contain a phosphonoalkyl moiety. Examples of the phosphonalkyl moiety include, but are not limited to, n-(phosphonomethyl) iminodiacetic acid (PMIDA), N-(carboxymethyl)-N-(phosphonomethyl)glycine, glycine, N,N'-1,2-ethanediylbis(N-(phosphonomethyl), glyphosine, aminotrimethylene phosphonic acid, sodium aminotris (methylenephosphonate), N-(2-hydroxyethyl)iminobis (methylphosphonic acid), phosphonic acid, P,P'-((2-propen-1-ylimino)bis(methylene))bis-, phosphonic acid, P,P',P"-(nitrilotris(methylene))tris-, (nitrilotris(methylene))trisphosphonic acid, ((methylimino)dimethylene)bisphosphonic acid, phosphonic acid, P,P',P",P"'-(oxybis(2,1-ethanediylnitrilobis(methylene))tetrakis-, ((propylimino)bis(methylene)) diphosphonic acid, phosphonic acid, P,P',P"-(nitrilotris (methylene))tris-, (ethylenedinitrilo)-tetramethylenephosphonic acid, ethylenebis(nitrilodimethylene)tetraphosphonic acid, (ethylenebis(nitrilobis(methylene)))tetrakisphosphonic acid, tetrasodium tetrahydrogen (ethane-1,2-diylbis(nitrilobis(methylene)))tetrakisphosphonate, 6-(bis (phosphonomethyl) amino)hexanoic acid, (phenylmethyl) imino)bis(methylene)bisphosphonic acid, phosphonobutane tricarboxylic acid, 2-hydroxyphosphono dicarboxylic acid, or any combination as well as salts (e.g., sodium, potassium, or ammonium salts).

The concentration of the aminopolycarboxylic acid, in the treatment fluid may range from about 0.1% (w/v) to about 50% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aminopolycarboxylic acid in the treatment fluid may range, from about 0.1% (w/v) to about 50% (w/v), from about 1% (w/v) to about 50% (w/v), from about 3% (w/v) to about 50% (w/v), from about 5% (w/v) to about 50% (w/v), from about 10% (w/v) to about 50% (w/v), from about 15% (w/v) to about 50% (w/v), from about 20% (w/v) to about 50% (w/v), from about 25% (w/v) to about 50% (w/v), from about 30% (w/v) to about 50% (w/v), from about 35% (w/v) to about 50% (w/v), from about 40% (w/v) to about 50% (w/v), or from about 45% (w/v) to about 50% (w/v). As another example, the concentration of the aminopolycarboxylic acid in the treatment fluid may range from about 0.1% (w/v) to about 50% (w/v), from about 0.1% (w/v) to about 45% (w/v), from about 0.1% (w/v) to about 40% (w/v), from about 0.1% (w/v) to about 35% (w/v), from about 0.1% (w/v) to about 30% (w/v), from about 0.1% (w/v) to about 25% (w/v), from about 0.1% (w/v) to about 20% (w/v), from about 0.1% (w/v) to about 15% (w/v), from about 0.1% (w/v) to about 10% (w/v), from about 0.1% (w/v) to about 5% (w/v), from about 0.1% (w/v) to about 3% (w/v), or from about 0.1% (w/v) to about 1% (w/v). With the benefit of this disclosure, one of ordinary skill in the art will be readily able to prepare a treatment fluid having a sufficient concentration of an aminopolycarboxylic acid for a given application.

The treatment fluid comprises a nanoparticle. In some examples, the nanoparticles may disperse into the aqueous fluid. The nanoparticle generally comprises particles in a size range of between about 20 nm to about 500 nm. The nanoparticles are both negatively and positively charged. Examples of the nanoparticle may include, but are not limited to, negatively and positively charged particle species comprising the following elements: aluminum, bismuth, cadmium, carbon, calcium, cerium, chromium, cobalt, copper, gallium, gold, indium, iridium, iron, magnesium, manganese, nickel, palladium, platinum, silicon, silver, selenium, thallium, tin, titanium, zinc, and any combination. Specific examples of the nanoparticle may include, but are not limited to, negatively and positively charged particle species comprising the following molecules: $Al_2O_3$, $Al(OH)_3$, $Al(BaCO)_3$, $Al(CH_3OO)_3$, $BaTiO_3$, $BaSO_4$, $Bi_2O_3$, $CaCO$, $CaSO_4$, $CdS$, $CeO_2$, $CoFe_2O_4$, $Co(II)O$, $Co_2O_3$, $Co_3O_4$, $Cr_3C_2$, $CrN_3$, $Cr_2O_3$, $CuO$, $Cu_2O$, $Cu(OH)_2$, $Cu(CH_3COO)_2$, $CuS$, $Fe_2O_3$, $Fe_3O_4$, $MgCO_3$, $Mo_2C$, $MoS_2$, $MoSi_2$, $MnFe_2O_4$, $MnO_2$, $MoSi_2$, $MnFe_2O_4$, $MnO_2$, $Mn_3O_4$, $NbC$, $Ni(OH)_2$, $NiO$, $SiC$, $Si_3N_4$, $SiO_2$, $SnO_2$, $SrCO_3$, $SrTiO_3$, $TiC$, $TiO_2$, $ZnO$, $ZnCO_3$, $ZrO_2$, and $Zr(OH)_4$. The nanoparticle may also include colloidal silical sols, an example of which includes, but is not limited to a polysiloxane oligomer.

The concentration of the nanoparticle in the treatment fluid may range from about 0.1% (w/v) to about 40% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the nanoparticle in the treatment fluid may range, from about 0.1% (w/v) to about 40% (w/v), from about 1% (w/v) to about 40% (w/v), from about 3% (w/v) to about 40% (w/v), from about 5% (w/v) to about 40% (w/v), from about 10% (w/v) to about 40% (w/v), from about 15% (w/v) to about 40% (w/v), from about 20% (w/v) to about 40% (w/v), from about 25% (w/v) to about 40% (w/v), from about 30% (w/v) to about 40% (w/v), or from about 35% (w/v) to about 40% (w/v). As another example, the concentration of the nanoparticle in the treatment fluid may range from about 0.1% (w/v) to about 40% (w/v), from about 0.1% (w/v) to about 35% (w/v), from about 0.1% (w/v) to about 30% (w/v), from about 0.1% (w/v) to about 25% (w/v), from about 0.1% (w/v) to about 20% (w/v), from about 0.1% (w/v) to about 15% (w/v), from about 0.1% (w/v) to about 10% (w/v), from about 0.1% (w/v) to about 5% (w/v), from about 0.1% (w/v) to about 3% (w/v), or from about 0.1% (w/v) to about 1% (w/v). With the benefit of this disclosure, one of ordinary skill in the art will be readily able to prepare a treatment fluid having a sufficient concentration of nanoparticle for a given application.

In some optional examples, the treatment fluid comprises a surfactant. In some examples, the surfactant may disperse into the oleaginous fluid of the treatment fluid. Examples of the surfactant include, but are not limited to, fatty acid alkoxylates, amine oxides, alkanolamides, alkoxylated alcohols, alkylamine alkoxylates, alkyl glycosides, or any combination thereof.

The concentration of the surfactant in the treatment fluid may range from about 0.1% (w/v) to about 10% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the surfactant in the treatment fluid may range from about 0.1% (w/v) to about 10% (w/v), from about 0.1% (w/v) to about 10% (w/v), from about 0.5% (w/v) to about 10% (w/v), from about 1% (w/v) to about 10% (w/v), from about 2% (w/v) to about 10% (w/v), from about 3% (w/v) to about 10% (w/v), from about 4% (w/v) to about 10% (w/v), from about 5% (w/v) to about 10% (w/v), from about 6% (w/v) to about 10% (w/v), from about 7% (w/v) to about 10% (w/v), from about 8% (w/v) to about 10% (w/v), or from about 9% (w/v) to about 10% (w/v). As another example, the concentration of the surfactant in the treatment fluid may range from about 0.1% (w/v) to about 10% (w/v), from about 0.1% (w/v) to about 9% (w/v), from about 0.1% (w/v) to about 8% (w/v), from about 0.1% (w/v) to about 7% (w/v), from about 0.1% (w/v) to about 6% (w/v), from about 0.1% (w/v) to about 5% (w/v), from about 0.1% (w/v) to about 4% (w/v), from about 0.1% (w/v) to about 3% (w/v), from about 0.1% (w/v) to about 2% (w/v), or from about 0.1% (w/v) to about 1% (w/v). With the benefit of this disclosure, one of ordinary skill in the art will be readily able to prepare a treatment fluid having a sufficient concentration of surfactant for a given application.

In some optional examples, the treatment fluid comprises an organic solvent. In some examples, the organic solvent may disperse into the oleaginous fluid of the treatment fluid. Examples of the organic solvent include, but are not limited to, a $C_5$ to $C_{50}$ hydrocarbon, a terpene, d-limonene, a dipentene, a pinene, a terpene obtained from the essence of oranges, ethyl lactate, an oil of turpentine, isobutyl alcohol, liner or branched distillates, methyl-9-deonate, 1-dodecyl-2-pyrollidinone, any dibasic ester not limited to dimethyl-2-methylglutarate, an ethoxylated, propoxylated terpene, N.N-dimethyl 9-decenamide, triethyl citrate, diethyl carbonate, n-methylpyrrolidone, an isoprene adduct, an isomer of an isoprene adduct, a $C_5$ to $C_{50}$ alkane, a $C_5$ to $C_{50}$ isoalkane, a $C_5$ to $C_{50}$ alkene, a silicone oil, a $C_1$ to $C_5$ alkyl ester of a substituted or unsubstituted $C_1$ to $C_{20}$ carboxylic acid or a combination thereof. or any combination thereof.

The concentration of the organic solvent in the treatment fluid may range from about 0.1% (w/v) to about 10% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the organic solvent in the treatment fluid may range from about 0.1% (w/v) to about 10% (w/v), from about 0.1% (w/v) to about 10% (w/v), from about 0.5% (w/v) to about 10% (w/v), from about 1% (w/v) to about 10% (w/v), from about 2% (w/v) to about 10% (w/v), from about 3% (w/v) to about 10% (w/v), from about 4% (w/v) to about 10% (w/v), from about 5% (w/v) to about 10% (w/v), from about 6% (w/v) to about 10% (w/v), from about 7% (w/v) to about 10% (w/v), from about 8% (w/v) to about 10% (w/v), or from about 9% (w/v) to about 10% (w/v). As another example, the concentration of the organic solvent in the treatment fluid may range from about 0.1% (w/v) to about 10% (w/v), from about 0.1% (w/v) to about 9% (w/v), from about 0.1% (w/v) to about 8% (w/v), from about 0.1% (w/v) to about 7% (w/v), from about 0.1% (w/v) to about 6% (w/v), from about 0.1% (w/v) to about 5% (w/v), from about 0.1% (w/v) to about 4% (w/v), from about 0.1% (w/v) to about 3% (w/v), from about 0.1% (w/v) to about 2% (w/v), or from about 0.1% (w/v) to about 1% (w/v). With the benefit of this disclosure, one of ordinary skill in the art will be readily able to prepare a treatment fluid having a sufficient concentration of organic solvent for a given application.

The treatment fluid comprises an aqueous fluid. The aqueous fluid may be from any source, provided that it does not contain an excess of compounds that may undesirably affect other components in the treatment fluid. In various examples, the aqueous fluid may comprise fresh water, salt water, seawater, brine, or an aqueous salt solution. In some examples, the aqueous fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like.

The concentration of the aqueous fluid in the treatment fluid may range from about 0.5% (w/v) to about 85% (w/v). The concentration of the aqueous fluid in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous fluid in the treatment fluid may range from about 0.5% (w/v) to about 85% (w/v), from about 1% (w/v) to about 85% (w/v), from about 5% (w/v) to about 85% (w/v), from about 10% (w/v) to about 85% (w/v), from about 15% (w/v) to about 85% (w/v), from about 20% (w/v) to about 85% (w/v), from about 25% (w/v) to about 85% (w/v), from about 30% (w/v) to about 85% (w/v), from about 35% (w/v) to about 85% (w/v), from about 40% (w/v) to about 85% (w/v), from about 45% (w/v) to about 85% (w/v), from about 50% (w/v) to about 85% (w/v), from about 55% (w/v) to about 85% (w/v), from about 60% (w/v) to about 85% (w/v), from about 65% (w/v) to about 85% (w/v), from about 70% (w/v) to about 85% (w/v), from about 75% (w/v) to about 85% (w/v), or from about 80% (w/v) to about 85% (w/v). As another example, the concentration of the aqueous fluid in the treatment fluid may range from about 0.5% (w/v) to about 85% (w/v), from about 0.5% (w/v) to about 80% (w/v), from about 0.5% (w/v) to about 75% (w/v), from about 0.5% (w/v) to about 70% (w/v), from about 0.5% (w/v) to about 65% (w/v), from about 0.5% (w/v) to about 60% (w/v), from about 0.5% (w/v) to about 55% (w/v), from about 0.5% (w/v) to about 50% (w/v), from about 0.5% (w/v) to about 45% (w/v), from about 0.5% (w/v) to about 40% (w/v), from about 0.5% (w/v) to about 35% (w/v), from about 0.5% (w/v) to about 30% (w/v), from about 0.5% (w/v) to about 25% (w/v), from about 0.5% (w/v) to about 20% (w/v), from about 0.5% (w/v) to about 15% (w/v), from about 0.5% (w/v) to about 10% (w/v), from about 0.5% (w/v) to about 5% (w/v), or from about 0.5% (w/v) to about 1% (w/v). With the benefit of this disclosure, one of ordinary skill in the art will be able to prepare a treatment fluid having an aqueous fluid for a given application.

Optionally, the treatment fluid comprises an oleaginous fluid used to provide an oleaginous phase to the treatment fluid. In these examples, the aqueous fluid forms an aqueous phase. The oleaginous phase and the aqueous phase may form an emulsion, microemulsion, nanoemulsion, or dispersion. The oleaginous fluid may be from any source, provided that it does not contain an excess of compounds that may undesirably affect other components in the treatment fluid. Examples of the oleaginous fluid include, but are not limited to a hydrocarbon oil, a synthetic oil, a diesel oil, a mineral oil, a refined oil, or a combination.

The concentration of the oleaginous fluid in the treatment fluid may range from about 0.5% (w/v) to about 85% (w/v). The concentration of the oleaginous fluid in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the oleaginous fluid in the treatment fluid may range from about 0.5% (w/v) to about 85% (w/v), from about 1% (w/v) to about 85% (w/v), from about 5% (w/v) to about 85% (w/v), from about 10% (w/v) to about 85% (w/v), from about 15% (w/v) to about 85% (w/v), from about 20% (w/v) to about 85% (w/v), from about 25% (w/v) to about 85% (w/v), from about 30% (w/v) to about 85% (w/v), from about 35% (w/v) to about 85% (w/v), from about 40% (w/v) to about 85% (w/v), from about 45% (w/v) to about 85% (w/v), from about 50% (w/v) to about 85% (w/v), from about 55% (w/v) to about 85% (w/v), from about 60% (w/v) to about 85% (w/v), from about 65% (w/v) to about 85% (w/v), from about 70% (w/v) to about 85% (w/v), from about 75% (w/v) to about 85% (w/v), or from about 80% (w/v) to about 85% (w/v). As another example, the concentration of the oleaginous fluid in the treatment fluid may range from about 0.5% (w/v) to about 85% (w/v), from about 0.5% (w/v) to about 80% (w/v), from about 0.5% (w/v) to about 75% (w/v), from about 0.5% (w/v) to about 70% (w/v), from about 0.5% (w/v) to about 65% (w/v), from about 0.5% (w/v) to about 60% (w/v), from about 0.5% (w/v) to about 55% (w/v), from about 0.5% (w/v) to about 50% (w/v), from about 0.5% (w/v) to about 45% (w/v), from about 0.5% (w/v) to about 40% (w/v), from about 0.5% (w/v) to about 35% (w/v), from about 0.5% (w/v) to about 30% (w/v), from about 0.5% (w/v) to about 25% (w/v), from about 0.5% (w/v) to about 20% (w/v), from about 0.5% (w/v) to about 15% (w/v), from about 0.5% (w/v) to about 10% (w/v), from about 0.5% (w/v) to about 5% (w/v), or from about 0.5% (w/v) to about 1% (w/v). With the benefit of this disclosure, one of ordinary skill in the art will be able to prepare a treatment fluid having an oleaginous fluid for a given application.

The treatment fluid comprises a pH in a range of about 5 to about 9. In some examples, the pH of the treatment fluid is in a range of about 6.5 to about 8.5. A pH adjustor may be added to shift the pH to a desired range. The pH adjustor may be any base sufficient for adjusting the pH of the treatment fluid to a range of about 5 to about 9 without negatively impacting the functionality of the other treatment fluid components. General examples of the pH adjustor include, but are not limited to, any hydroxide or metal hydroxide, borates, or a combination thereof. Specific examples of the pH adjustor include, but are not limited to, ammonium hydroxide, sodium hydroxides, manganese(II) hydroxide, barium hydroxide octahydrate, aluminum hydroxide, calcium hydroxide, iron(III) hydroxide, barium hydroxide, magnesium hydroxide, potassium hydroxide, chromium(III) hydroxide, tin(IV) hydroxide, chromium(II) hydroxide, silver hydroxide, lead(IV) hydroxide, platinum (IV) hydroxide, zinc hydroxide, copper(II) hydroxide, beryllium hydroxide, vanadium(V) hydroxide, iron(II) hydroxide, manganese(IV) hydroxide, lead(II) hydroxide, strontium hydroxide, tin(II) hydroxide, vanadium(III) hydroxide, lithium hydroxide, mercury(II) hydroxide, nickel (II) hydroxide, mercury(I) hydroxide, copper(I) hydroxide, tetraethylammonium hydroxide, tetrabutylammonium hydroxide, choline hydroxide, urea and tetrabutyl urea, isobutylene diurea, derivatives thereof, or any combination thereof. A preferred example of the pH adjustor is ammonium hydroxide.

In some optional examples, the treatment fluid may comprise an additive. The additive may be used to adjust a property of the treatment fluid, for example, viscosity, density, etc. Examples of the additives include, but are not limited to, silica scale control additives, corrosion inhibitors, surfactants, gel stabilizers, anti-oxidants, polymer degradation prevention additives, relative permeability modifiers, scale inhibitors, foaming agents, defoaming agents, anti-foaming agents, emulsifying agents, de-emulsifying agents, iron control agents, proppants or other particulates, particulate diverters, salts, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art and the benefit of this disclosure will be able to formulate a treatment fluid having properties suitable for a desired application.

It is also to be recognized that the disclosed treatment fluids may also directly or indirectly affect the various downhole equipment and tools that may contact the treatment fluids disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-2.

Provided are methods of treating a subterranean formation in accordance with the disclosure and the illustrated FIGs. An example method comprises introducing a treatment fluid into a wellbore, wherein the treatment fluid comprises: an aqueous fluid, an aminopolycarboxylic acid, a nanoparticle dispersed, and an organic solvent; wherein the treatment fluid has a pH in a range between about 5 to about 9. The method further comprises contacting a rock surface in the subterranean formation; wherein at least a portion of the rock surface is coated with a hydrocarbon, removing a portion of the hydrocarbon from the rock surface, and altering the rock surface to be water-wet.

Additionally or alternatively, the method may include one or more of the following features individually or in combination. The aminopolycarboxylic acid may comprise N-phosphonomethyl iminodiacetic acid, glycine-N,N-bis (methylene phosphonic acid), hydroxyethylenediaminetetraacetic acid, N-(2-hydroxyethyl)ethylenediaminetriacetic acid, hydroxyethyliminodiacetic acid, methylglycine diacetic acid, glutamic acid diacetic acid, ethylenediaminedisuccinic acid, 3-hydroxy-2,2'-iminodisuccinic acid, beta-alaninediacetic acid, diethylenetriaminepentaacetic acid, cyclohexylenediaminetetraacetic acid, nitrilotriacetic acid, diphenylaminesulfonic acid, polyaminoacids, polyaspartic acid, polyitaconic acid, polysuccinic acid, polylactic acid, polyglycolic acid, or any combination thereof. The aminocarboxylic acid may comprise a phosphonalkyl moiety including, but not limited to, (P, N-(carboxymethyl)-N-(phosphonomethyl)glycine, glycine, N,N'-1,2-ethanediylbis (N-phosphonomethyl), glyphosine, aminotrimethylene phosphonic acid, sodium aminotris(methylenephosphonate), N-(2-hydroxyethyl)iminobis (methylphosphonic acid), phosphonic acid, P,P'-((2-propen-1-ylimino)bis(methylene)) bis-, phosphonic acid, P,P',P''-(nitrilotris(methylene))tris-, (nitrilotris(methylene))trisphosphonic acid, ((methylimino) dimethylene)bisphosphonic acid, phosphonic acid, P,P',P'', P'''-(oxybis(2,1-ethanediylnitrilobis(methylene))tetrakis-, ((propylimino)bis(methylene))diphosphonic acid, phosphonic acid, P,P',P''-(nitrilotris(methylene))tris-, (ethylenedinitrilo)-tetramethylenephosphonic acid, ethylenebis(nitrilodimethylene)tetraphosphonic acid, (ethylenebis(nitrilobis (methylene)))tetrakisphosphonic acid, tetrasodium tetrahydrogen (ethane-1,2-diylbis(nitrilobis(methylene))) tetrakisphosphonate, 6-(bis(phosphonomethyl) amino) hexanoic acid, (phenylmethyl)imino)bis(methylene)bisphosphonic acid, phosphonobutane tricarboxylic acid, 2-hydroxyphosphono dicarboxylic acid, salts thereof, and any combination thereof. The aminopolycarboxylic acid may be present in the treatment fluid in a concentration in a range between about 0.1% (w/v) to about 50% (w/v). The nanoparticle may comprise aluminum, bismuth, cadmium, carbon, calcium, cerium, chromium, cobalt, copper, gallium, gold, indium, iridium, iron, magnesium, manganese, nickel, palladium, platinum, silicon, silver, selenium, thallium, tin, titanium, zinc, $Al_2O_3$, $Al(OH)_3$, $Al(BaCO)_3$, $Al(CH_3OO)_3$, $BaTiO_3$, $BaSO_4$, $Bi_2O_3$, $CaCO$, $CaSO_4$, $CdS$, $CeO_2$, $CoFe_2O_4$, $Co(II)O$, $CO_2O_3$, $Co_3O_4$, $Cr_3C_2$, $CrN_3$, $Cr_2O_3$, $CuO$, $Cu_2O$, $Cu(OH)_2$, $Cu(CH_3COO)_2$, $CuS$, $Fe_2O_3$, $Fe_3O_4$, $MgCO_3$, $Mo_2C$, $MoS_2$, $MoSi_2$, $MnFe_2O_4$, $MnO_2$, $MoSi_2$, $MnFe_2O_4$, $MnO_2$, $Mn_3O_4$, $NbC$, $Ni(OH)_2$, $NiO$, $SiC$, $Si_3N_4$, $SiO_2$, $SnO_2$, $SrCO_3$, $SrTiO_3$, $TiC$, $TiO_2$, $ZnO$, $ZnCO_3$, $ZrO_2$, $Zr(OH)_4$, a colloidal silica sol, or a combination thereof. The treatment fluid may further comprise an oleaginous fluid. The nanoparticle may be present in the treatment fluid in a concentration in a range between about 0.1% (w/v) to about 40% (w/v). The nanoparticle may have a particle size between about 20 nm to about 500 nm. The treatment fluid may further comprise a surfactant; wherein the surfactant comprises a fatty acid alkoxylate, an amine oxide, an alkanolamide, an alkoxylated alcohol, an alkylamine alkoxylate, an alkyl glycoside, or any combination thereof. The treatment fluid may be injected into a fracture comprising the rock surface, wherein the fracture comprises an entrance that is accessible from the wellbore. The wellbore may be a parent well proximate a child well; wherein the treatment fluid is injected into the child well and flows into the parent well. The treatment fluid may be injected into the wellbore during a refracturing, restimulating, waterflood, or an enhanced oil recovery operation.

Provided are treatment fluids for treating a subterranean formation in accordance with the disclosure and the illustrated FIGs. An example treatment fluid comprises an aqueous fluid, an aminopolycarboxylic acid, a nanoparticle, and an organic solvent; wherein the treatment fluid has a pH in a range between about 5 to about 9.

Additionally or alternatively, the treatment fluid may include one or more of the following features individually or in combination. The aminopolycarboxylic acid may comprise N-phosphonomethyl iminodiacetic acid, glycine-N,N-bis(methylene phosphonic acid), hydroxyethylenediaminetetraacetic acid, N-(2-hydroxethyl)ethylenediaminetriacetic acid, hydroxyethyliminodiacetic acid, methylglycine diacetic acid, glutamic acid diacetic acid, ethylenediaminedisuccinic acid, 3-hydroxy-2,2'-iminodisuccinic acid, beta-alaninediacetic acid, diethylenetriaminepentaacetic acid, cyclohexylenediaminetetraacetic acid, nitrilotriacetic acid, diphenylaminesulfonic acid, polyaminoacids, polyaspartic acid, polyitaconic acid, polysuccinic acid, polylactic acid, polyglycolic acid, or any combination thereof.

The aminocarboxylic acid may comprise a phosphonalkyl moiety including, but not limited to, (P, N-(carboxymethyl)-N-(phosphonomethyl)glycine, glycine, N,N'-1,2-ethanediyl-bis(N-(phosphonomethyl), glyphosine, aminotrimethylene phosphonic acid, sodium aminotris(methylenephosphonate), N-(2-hydroxyethyl)iminobis (methylphosphonic acid), phosphonic acid, P,P'-((2-propen-1-ylimino)bis(methylene)) bis-, phosphonic acid, P,P',P''-(nitrilotris(methylene))tris-, (nitrilotris(methylene))trisphosphonic acid, ((methylimino) dimethylene)bisphosphonic acid, phosphonic acid, P,P',P'', P'''-(oxybis(2,1-ethanediylnitrilobis(methylene))tetrakis-, ((propylimino)bis(methylene))diphosphonic acid, phosphonic acid, P,P',P''-(nitrilotris(methylene))tris (ethylenedinitrilo)-tetramethylene- phosphonic acid, ethylenebis(nitrilodimethylene)tetraphosphonic acid, (ethylenebis (nitrilobis(methylene)))tetrakisphosphonic acid, tetrasodium tetrahydrogen (ethane-1,2-diylbis(nitrilobis(methylene)))tetrakisphosphonate, 6-(bis(phosphonomethyl) amino)hexanoic acid, (phenylmethyl)imino)bis(methylene) bisphosphonic acid, phosphonobutane tricarboxylic acid, 2-hydroxyphosphono dicarboxylic acid, salts thereof, and any combination thereof. The aminopolycarboxylic acid may be present in the treatment fluid in a concentration in a range between about 0.1% (w/v) to about 50% (w/v). The nanoparticle may comprise aluminum, bismuth, cadmium, carbon, calcium, cerium, chromium, cobalt, copper, gallium, gold, indium, iridium, iron, magnesium, manganese, nickel, palladium, platinum, silicon, silver, selenium, thallium, tin, titanium, zinc, $Al_2O_3$, $Al(OH)_3$, $Al(BaCO)_3$, $Al(CH_3OO)_3$, $BaTiO_3$, $BaSO_4$, $Bi_2O_3$, $CaCO$, $CaSO_4$, $CdS$, $CeO_2$, $CoFe_2O_4$, $Co(II)O$, $CO_2O_3$, $Co_3O_4$, $Cr_3C_2$, $CrN_3$, $Cr_2O_3$, $CuO$, $Cu_2O$, $Cu(OH)_2$, $Cu(CH_3COO)_2$, $CuS$, $Fe_2O_3$, $Fe_3O_4$, $MgCO_3$, $Mo_2C$, $MoS_2$, $MoSi_2$, $MnFe_2O_4$, $MnO_2$, $MoSi_2$, $MnFe_2O_4$, $MnO_2$, $Mn_3O_4$, $NbC$, $Ni(OH)_2$, $NiO$, $SiC$, $Si_3N_4$, $SiO_2$, $SnO_2$, $SrCO_3$, $SrTiO_3$, $TiC$, $TiO_2$, $ZnO$, $ZnCO_3$, $ZrO_2$, $Zr(OH)_4$, a colloidal silica sol, or a combination thereof. The treatment fluid may further comprise an oleaginous fluid. The nanoparticle may be present in the treatment fluid in a concentration in a range between about 0.1% (w/v) to about 40% (w/v). The nanoparticle may have a particle size between about 20 nm to about 500 nm. The treatment fluid may further comprise a surfactant; wherein the surfactant comprises a fatty acid alkoxylate, an amine oxide, an alkanolamide, an alkoxylated alcohol, an alkylamine alkoxylate, an alkyl glycoside, or any combination thereof.

Provided are systems for treating a subterranean formation in accordance with the disclosure and the illustrated FIGs. An example system comprises a treatment fluid comprising: an aqueous fluid, an aminopolycarboxylic acid, a nanoparticle, and an organic solvent; wherein the treatment fluid has a pH in a range between about 5 to about 9. The system further comprises mixing equipment configured to mix the aminopolycarboxylic acid, the nanoparticle, and the organic solvent to provide the treatment fluid and pumping equipment configured to pump the treatment fluid into the wellbore to a location comprising the rock surface.

Additionally or alternatively, the system may include one or more of the following features individually or in combination. The aminopolycarboxylic acid may comprise N-phosphonomethyl iminodiacetic acid, glycine-N,N-bis (methylene phosphonic acid), hydroxyethylenediaminetetraacetic acid, N-(2-hydroxyethyl)ethylenediaminetriacetic acid, hydroxyethyliminodiacetic acid, methylglycine diacetic acid, glutamic acid diacetic acid, ethylenediaminedisuccinic acid, 3-hydroxy-2,2'-iminodisuccinic acid, beta-alaninediacetic acid, diethylenetriaminepentaacetic acid, cyclohexylenediaminetetraacetic acid, nitrilotriacetic acid, diphenylaminesulfonic acid, polyaminoacids, polyaspartic acid, polyitaconic acid, polysuccinic acid, polylactic acid, polyglycolic acid, or any combination thereof. The aminocarboxylic acid may comprise a phosphonalkyl moiety including, but not limited to, (P, N-(carboxymethyl)-N-(phosphonomethyl)glycine, glycine, N,N'-1,2-ethanediylbis (N-(phosphonomethyl), glyphosine, aminotrimethylene phosphonic acid, sodium aminotris(methylenephosphonate), N-(2-hydroxyethyl)iminobis (methylphosphonic acid), phosphonic acid, P,P'-((2-propen-1-ylimino)bis(methylene)) bis-, phosphonic acid, P,P',P'''-(nitrilotris(methylene))tris-, (nitrilotris(methylene))trisphosphonic acid, ((methylimino) dimethylene)bisphosphonic acid, phosphonic acid, P,P',P''', P''''-(oxybis(2,1-ethanediylnitrilobis(methylene))tetrakis-, ((propylimino)bis(methylene))diphosphonic acid, phosphonic acid, P,P',P'''-(nitrilotris(methylene))tris-, (ethylenedinitrilo)-tetramethylenephosphonic acid, ethylenebis(nitrilodimethylene)tetraphosphonic acid, (ethylenebis(nitrilobis (methylene)))tetrakisphosphonic acid, tetrasodium tetrahydrogen (ethane-1,2-diylbis(nitrilobis(methylene))) tetrakisphosphonate, 6-(bis(phosphonomethyl) amino) hexanoic acid, (phenylmethyl)imino)bis(methylene)bisphosphonic acid, phosphonobutane tricarboxylic acid, 2-hydroxyphosphono dicarboxylic acid, salts thereof, and any combination thereof. The aminopolycarboxylic acid may be present in the treatment fluid in a concentration in a range between about 0.1% (w/v) to about 50% (w/v). The nanoparticle may comprise aluminum, bismuth, cadmium, carbon, calcium, cerium, chromium, cobalt, copper, gallium, gold, indium, iridium, iron, magnesium, manganese, nickel, palladium, platinum, silicon, silver, selenium, thallium, tin, titanium, zinc, $Al_2O_3$, $Al(OH)_3$, $Al(BaCO)_3$, $Al(CH_3OO)_3$, $BaTiO_3$, $BaSO_4$, $Bi_2O_3$, $CaCO$, $CaSO_4$, $CdS$, $CeO_2$, $CoFe_2O_4$, $Co(II)O$, $CO_2O_3$, $Co_3O_4$, $Cr_3C_2$, $CrN_3$, $Cr_2O_3$, $CuO$, $Cu_2O$, $Cu(OH)_2$, $Cu(CH_3COO)_2$, $CuS$, $Fe_2O_3$, $Fe_3O_4$, $MgCO_3$, $Mo_2C$, $MoS_2$, $MoSi_2$, $MnFe_2O_4$, $MnO_2$, $MoSi_2$, $MnFe_2O_4$, $MnO_2$, $Mn_3O_4$, $NbC$, $Ni(OH)_2$, $NiO$, $SiC$, $Si_3N_4$, $SiO_2$, $SnO_2$, $SrCO_3$, $SrTiO_3$, $TiC$, $TiO_2$, $ZnO$, $ZnCO_3$, $ZrO_2$, $Zr(OH)_4$, a colloidal silica sol, or a combination thereof. The treatment fluid may further comprise an oleaginous fluid. The nanoparticle may be present in the treatment fluid in a concentration in a range between about 0.1% (w/v) to about 40% (w/v). The nanoparticle may have a particle size between about 20 nm to about 500 nm. The treatment fluid may further comprise a surfactant; wherein the surfactant comprises a fatty acid alkoxylate, an amine oxide, an alkanolamide, an alkoxylated alcohol, an alkylamine alkoxylate, an alkyl glycoside, or any combination thereof.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for treating a subterranean formation, the method comprising:
   introducing a treatment fluid into a wellbore, wherein the treatment fluid comprises:
      an aqueous fluid,
      an aminopolycarboxylic acid selected from the group consisting of N-phosphonomethyl iminodiacetic acid, glycine-N,N-bis(methylene phosphonic acid), N-(2-hydroxethyl)ethylenediaminetriacetic acid, hydroxyethyliminodiacetic acid, methylglycine diacetic acid, glutamic acid diacetic acid, ethylenediaminedisuccinic acid, 3-hydroxy-2,2'-iminodisuccinic acid, beta-alaninediacetic acid, diethylenetriaminepentaacetic acid, cyclohexylenediaminetetraacetic acid, polyaminoacids, polyaspartic acid, and any combination thereof,
      a nanoparticle dispersed, wherein the nanoparticle comprises particle sizes in a size range of between about 20 nm to about 500 nm, wherein the nanoparticle comprises a nanoparticles selected from the group consisting of aluminum, bismuth, cadmium, carbon, calcium, cerium, chromium, cobalt, copper, gallium, gold, indium, iridium, iron, magnesium, manganese, nickel, palladium, platinum, silicon, silver, selenium, thallium, tin, titanium, zinc, $Al_2O_3$, $Al(OH)_3$, $Al(BaCO)_3$, $Al(CH_3OO)_3$, $BaTiO_3$, $BaSO_4$, $Bi_2O_3$, $CaCO$, $CaSO_4$, $CdS$, $CeO_2$, $CoFe_2O_4$, $Co(II)O$, $Co_2O_3$, $Co_3O_4$, $Cr_3C_2$, $CrN_3$, $Cr_2O_3$, $CuO$, $Cu_2O$, $Cu(OH)_2$, $Cu(CH_3COO)_2$, $CuS$, $Fe_2O_3$, $Fe_3O_4$, $MgCO_3$, $Mo_2C$, $MoS_2$, $MoSi_2$, $MnFe_2O_4$, $MnO_2$, $MoSi_2$, $MnFe_2O_4$, $MnO_2$, $Mn_3O_4$, $NbC$, $Ni(OH)_2$, $NiO$, $SiC$, $Si_3N_4$, $SiO_2$, $SnO_2$, $SrCO_3$, $SrTiO_3$, $TiC$, $TiO_2$, $ZnO$, $ZnCO_3$, $ZrO_2$, $Zr(OH)_4$, a colloidal silica sol, and a combination thereof; and an organic solvent; wherein the treatment fluid has a pH in a range between about 5 to about 9, contacting a rock surface in the subterranean formation; wherein at least a portion of the rock surface is coated with a hydrocarbon and the hydrocarbon is contacted by the nanoparticle and the aminopolycarboxylic acid, and removing a portion of the hydrocarbon from the rock surface with the nanoparticle and the aminopolycarboxylic acid.

2. The method of claim 1, wherein the treatment fluid additionally comprises one of the following: diphenylaminesulfonic acid, polyitaconic acid, polysuccinic acid, polylactic acid, polyglycolic acid, or any combination thereof.

3. The method of claim 1, wherein the aminopolycarboxylic acid is present in the treatment fluid in a concentration in a range between about 0.1% (w/v) to about 50% (w/v).

4. The method of claim 1, wherein the treatment fluid further comprises an oleaginous fluid.

5. The method of claim 1, wherein the nanoparticle is present in the treatment fluid in a concentration in a range between about 0.1% (w/v) to about 40% (w/v).

6. The method of claim 1, wherein the treatment fluid further comprises a surfactant; wherein the surfactant comprises a fatty acid alkoxylate, an amine oxide, an alkanolamide, an alkoxylated alcohol, an alkylamine alkoxylate, an alkyl glycoside, or any combination thereof.

7. The method of claim 1, wherein the treatment fluid is injected into a fracture comprising the rock surface, wherein the fracture comprises an entrance that is accessible from the wellbore.

8. The method of claim 1, wherein the wellbore is a parent well proximate a child well; wherein the treatment fluid is injected into the child well and flows into the parent well.

9. The method of claim 1, wherein the treatment fluid is injected into the wellbore during a refracturing, restimulating, waterflood, or an enhanced oil recovery operation.

10. The method of claim 1, wherein the organic solvent is a $C_5$ to $C_{50}$ hydrocarbon, a terpene, d-limonene, a dipentene, a pinene, a terpene obtained from the essence of oranges, ethyl lactate, an oil of turpentine, isobutyl alcohol, linear or branched distillates, methyl-9-deonate, 1-dodecyl-2-pyrollidinone, a dibasic ester, an ethoxylated, propoxylated terpene, N,N-dimethyl 9-decenamide, triethyl citrate, diethyl carbonate, n-methylpyrrolidone, an isoprene adduct, an isomer of an isoprene adduct, a $C_5$ to $C_{50}$ alkane, a $C_5$ to $C_{50}$ isoalkane, a $C_5$ to $C_{50}$ alkene, a silicone oil, a $C_1$ to $C_5$ alkyl ester of a substituted or unsubstituted $C_1$ to $C_{20}$ carboxylic acid, or a combination thereof.

11. The method of claim 1, wherein the organic solvent is present in the treatment fluid in a concentration in a range between about 0.1% (w/v) to about 10% (w/v).

* * * * *